Dec. 6, 1927.  1,651,964
J. NELSON
AIR COMPRESSOR
Filed June 16, 1924
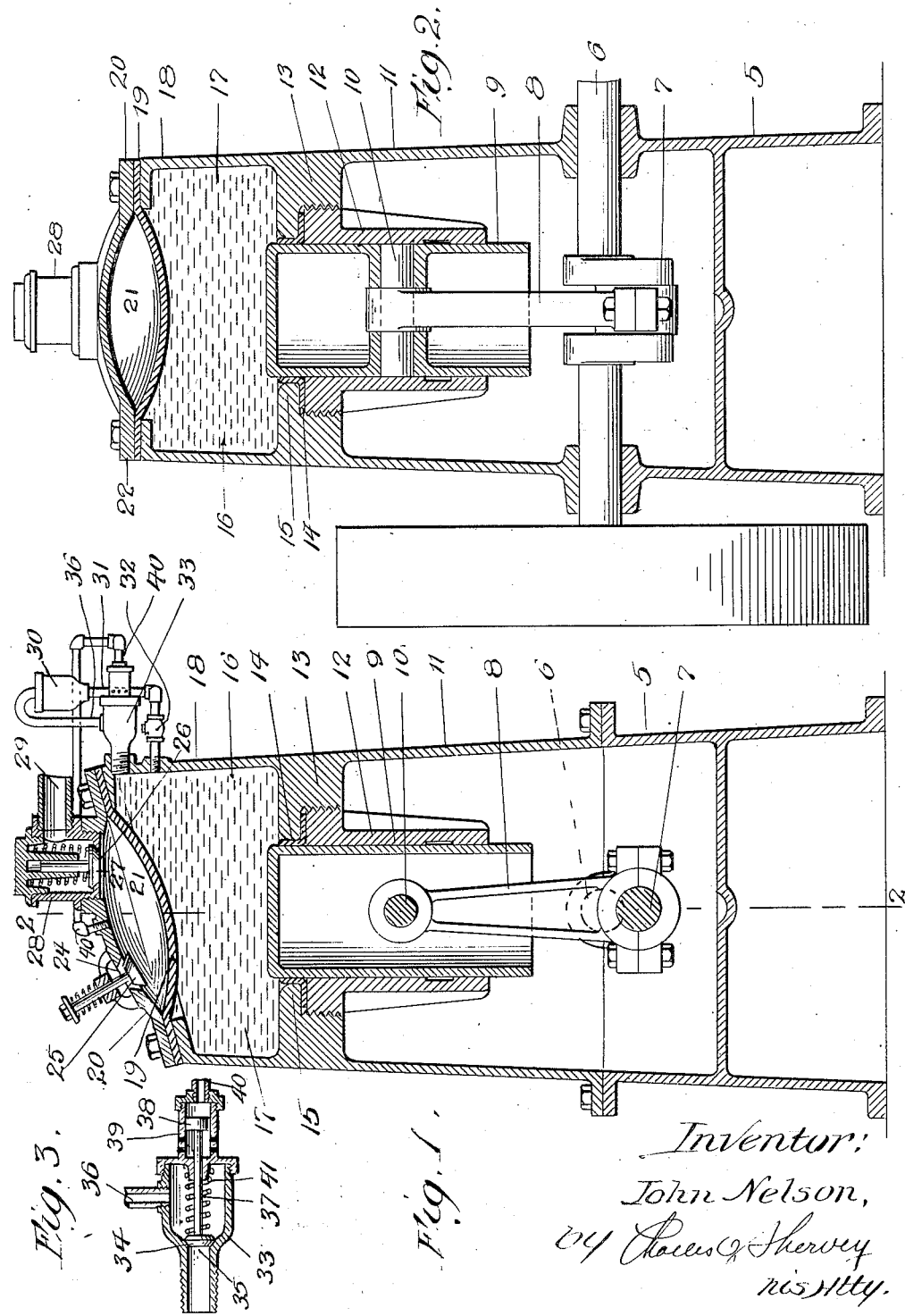

Patented Dec. 6, 1927.

1,651,964

UNITED STATES PATENT OFFICE.

JOHN NELSON, OF CHICAGO, ILLINOIS.

AIR COMPRESSOR.

Application filed June 16, 1924. Serial No. 720,313.

This invention relates to air compressors, and its principal objects are to increase the efficiency of air compressors, and to deliver compressed air, free from oil or other extraneous fluid matter. As is well known, compressed air is used in many commercial pursuits, where it is extremely necessary that the air shall be free from oil or other fluid matter. This is particularly the case where air is used in air brush painting. In service stations for automobiles, air compressors are used for supplying compressed air for tires. The air should be free from oil, otherwise, when introduced into tire tubes, the oil causes rapid deterioration of the tubes. In many other plants, where compressed air is used it is absolutely necessary to success, that the compressed air used, be free from oil.

In accordance with the present invention, all of the air taken into the compressor, is compressed without coming into contact with any piston or plunger, (which is usually well lubricated and carries oil on its surfaces). The air is compressed in an air chamber which is isolated from the piston or plunger, whereby it has no opportunity to come in contact with oil or other liquid substance. Moreover, in accordance with the present invention, a flexible diaphragm is employed between the air chamber and a pressure chamber, in which pressure chamber is contained a liquid piston cooperating with a power operated plunger to pump the air. One object is to eliminate any clearance spaces in the air chamber whereby all of the air taken into the same upon the suction stroke may be expelled upon the following discharge stroke, thereby obtaining a maximum efficiency.

Another object of this invention is to provide a structure capable of use as a motor or engine by the addition of suitable valve mechanism.

With these and other objects and advantages in view, this invention consists in an air compressor having an air chamber isolated from its piston or plunger. It further consists in an air compressor having an air chamber and a piston or pressure chamber separated by a flexible diaphragm. It further consists in an air compressor having an air chamber and a pressure chamber containing a liquid piston and power operated plunger, the two chambers being separated by a flexible diaphragm. It further consists in a structure containing an air chamber and a fluid piston chamber, separated by a flexible diaphragm. It further consists in the several novel features herein- after fully set forth and claimed.

The invention is clearly illustrated in the accompanying drawings, in which:—

Fig. 1 is a central, vertical section through an air compressor embodying the preferred form of my invention; Fig. 2 is a central, vertical section taken on line 2—2 of Fig. 1 and Fig. 3 is a detail section taken through a relief valve used in connection with the compressor.

Referring to said drawings, the reference character 5 designates a base, in which is journaled a crank shaft 6, having a crank 7 thereon, connected to a piston rod 8, which is connected to a piston or plunger 9 by a wrist pin 10. The parts described may take the form of many of the common and well known corresponding parts. Suitable provision is made for lubricating the moving parts, as is well understood.

Mounted on the base 5, is a case or housing 11 in which is a cylinder or guide member 12 for the piston or plunger 9, and said cylinder may be made as a part of the case 11 or may be separate therefrom and secured thereto by a threaded connection as shown. In the present instance the case 11 is formed with an internal threaded flange 13, and the upper end of the cylinder 12 is threaded and screwed into the flange. A flange washer 14 is held between a shouldered part 15 of the flange 13 and cylinder 12, and provides a tight joint around the piston or plunger 9.

Above the flange 13 the case 11 has a chambered portion 16 in which is contained a liquid piston 17, preferably composed of a vegetable oil, which liquid piston cooperates with the plunger 9 to pump air. Secured to the upper end of the wall 18 of the chamber 16, is a flexible diaphragm 19, preferably formed of rubber or fabric reinforced rubber, and secured to said wall 18 above the diaphragm is a dome shaped head or wall 20 which cooperates with the diaphragm 19 to form an expansible and contractible chamber 21, into which the air is admitted and from which it is discharged under pressure. Conveniently, the top of the wall 18 may be formed with an annular flange 22, and the diaphragm 19 and head 20 may be formed with correspondingly shaped flanges bolted thereto.

The head 20 has an air inlet port 24, controlled by an inwardly opening check valve 25 and the head has also a discharge port 26 controlled by an outwardly opening check valve 27. A valve case 28 is secured on the head above the check valve 27 and encloses the same, and a discharge pipe 29 leads from said valve case to a tank, reservoir or other container (not shown) for the compressed air. The lower faces of the check valves should be made flush with the underface of the head, whereby air pockets are eliminated between the head and diaphragm when the latter is in its upwardly bowed condition. As a preference, the air chamber 21, is inclined slightly as shown, although it may be placed in a horizontal position, if desired.

In the operation of the compressor, sufficient liquid is admitted to the pressure chamber to completely fill the same when the diaphragms and plunger are at the top of the compression strokes of the plunger. Power being applied to the crank shaft, the plunger is reciprocated as is well understood. On its down or intake stroke the upper face of the liquid piston is lowered, thereby rarefying the air chamber into which air enters through the air inlet port 24. On the up stroke or compression stroke of the plunger, the latter enters the pressure chamber, displaces the liquid piston therein and the latter forces the diaphragm upward and discharges the air from the air chamber, through the discharge port 26, it being understood that the inlet valve 25 closes at the end of the down stroke of the plunger, and the outlet valve opens at the commencement of the up stroke thereof.

It is evident that the air which enters the air chamber passes through the same without coming into contact with the plunger or any other oiled parts, consequently compressed air, free from oil, is delivered by the compressor.

In order to constantly maintain the required amount of liquid in the pressure chamber to cause the compressor to function properly, I provide automatic means for supplying liquid as it is required, said means will now be described.

Connected with the pressure chamber 16, is a liquid supply cup or receptacle, 30 in which is contained a supply of the liquid. As shown a pipe 31 leads from the cup to the chamber 16 and has an inwardly opening spring operated check valve 32 interposed therein which opens in case the pressure in the chamber 16 is lowered sufficiently on the down stroke of the plunger, to overcome the spring of the check valve, thereby admitting to the pressure chamber a quantity of the liquid contained in the cup 30. To prevent an excess amount to remain in the pressure chamber I provide a relief valve 33, which is connected to the pressure chamber. In its present form it is provided with a threaded neck which is screwed into the wall 18 of the chamber. Said relief valve contains a balanced and spring pressed check valve 34 which controls an escape port 35 that connects the pressure chamber with the interior of the casing of the relief valve. An overflow pipe 36 leads from the casing of the relief valve 33 and empties into the cup 30. On the stem 37 of the check valve 34 is a plunger 38 which is contained in a cylinder 39, the end of which is in communication with the air chamber 21, a pipe 40 being shown which leads from the air chamber 21 to the end of the cylinder 39. The areas of the check valve 34 and plunger 38, are practically equal, whereby the check valve will normally remain closed under the influence of its spring 41. The check valve is normally held closed by the spring, but in case an excess amount of liquid is contained in the pressure chamber over that required, the relief valve opens under the excess pressure, permitting the excess liquid to escape and replenish that in the supply cup 30.

The automatic liquid supply device may be omitted, and a supply cup only used. In this case a manually operated valve is substituted for the check valve 32, which may be manipulated by an attendant.

In the specification the terms "diaphragm" and "flexible diaphragm" have been used to describe the partition between the air chamber and pressure chamber. It is to be understood, however, that wherever these terms occur they include various equivalent forms of partitions between said chambers, which yield or move under the influence of variations of pressure in the pressure chamber.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. In an air compressor, the combination of a casing having a stationary, dome like top wall secured to the upper end thereof, there being inlet and outlet air passages having ports at the inner face of said dome like top wall, and inlet and outlet valves directly closing said ports, a diaphragm having its edge portion secured between the upper end of said casing and top wall, and forming a flexible wall directly between and dividing the casing into an air chamber at the upper portion and a pressure chamber directly therebelow, said casing having a transverse wall forming the bottom of said pressure chamber, and displacement means in said chamber comprising a liquid piston and a power operated plunger of less diameter than the pressure chamber, movable into the body of liquid in said pressure chamber.

2. In an air compressor, the combination of a casing having a stationary, dome like top wall secured to the upper end thereof, there being inlet and outlet air passages having ports located at the inner face of said top wall, and inlet and outlet valves directly closing said ports, a flexible diaphragm having its edge portion secured between the upper end of said casing and top wall, and forming a flexible wall directly between and dividing the casing into an air chamber at the upper portion and a pressure chamber immediately therebelow, said casing having an annular wall and a cylindrical bearing member secured therein directly below said pressure chamber, a reciprocatory plunger of less diameter than the pressure chamber reciprocating in said bearing member and movable into and out of said pressure chamber and a liquid piston filling the space in said pressure chamber.

3. In an air compressor, the combination of an air chamber having valve controlled inlet and outlet ports, a pressure chamber, a flexible diaphragm forming one wall of and separating said air chamber from said pressure chamber, displacement means in said pressure chamber, comprising a liquid piston and a power operated plunger, a valve controlled liquid supply cup connected with said pressure chamber, and a balanced relief valve connected with said pressure chamber and having an overflow pipe emptying into said supply cup.

JOHN NELSON.